United States Patent [19]

Brown

[11] 3,993,725

[45] Nov. 23, 1976

[54] METHOD OF FORMING A SLIDE FASTENER

[76] Inventor: Alexander M. Brown, 715 S. Beach St. 309-D, Daytona Beach, Fla. 32014

[22] Filed: Mar. 15, 1972

[21] Appl. No.: 234,809

Related U.S. Application Data

[62] Division of Ser. No. 782,973, Dec. 11, 1968, Pat. No. 3,711,903.

[52] U.S. Cl. .................................. 264/145; 264/146; 264/152; 264/261

[51] Int. Cl.$^2$ .................................. B29D 5/00

[58] Field of Search ............ 264/261, 145, 146, 152

[56] References Cited

UNITED STATES PATENTS

| | | | |
|---|---|---|---|
| 2,026,754 | 1/1936 | Stafford | 264/146 |
| 3,608,035 | 9/1971 | Frolich | 264/146 |

*Primary Examiner*—Richard R. Kucia

*Attorney, Agent, or Firm*—Wegner, Stellman, McCord, Wiles & Wood

[57] ABSTRACT

A method of forming an interdigitating fastener having an extruded slit core strip embedded in an extruded slit carrier strip. The core strip is slit in a serpentine manner to define interdigitating exposed portions and includes mechanical interlocking means for retaining each half of the slit core strip in the corresponding carrier strip portion to define a pair of separable assemblies adapted to be connected together and separated selectively by means of an associated slider. In one form the slider is provided with a wedging diamond which extends sufficiently to engage the carrier above and below the core strip and in a second form the slider includes a diamond which engages only the carrier strip outwardly of one face of the core strip. The fastener is economically manufactured by extruding the core strip, slitting the extruded core strip to define the serpentine interdigitating portions, extruding a carrier strip about the slit core strip and slitting the carrier strip to define a pair of core and carrier strip assemblies.

28 Claims, 15 Drawing Figures

11
11a
11b
12
13
14
15
16
17
18
18a
18a'
18b
18b'
19
20
21
22
23
24
25
26
27
28
29
30
31
32
33
34
35
36
37
45
46
2.
4.
6.
7.
10

METHOD OF FORMING A SLIDE FASTENER

This is a division of application Ser. No. 782,973 filed Dec. 11, 1968, now issued as U.S. Pat. No. 3,711,903, on Jan, 23, 1973.

BACKGROUND OF THE INVENTION

1. Field of the Invention

This invention relates to fasteners and in particular to forming slide fasteners of the interdigitating type.

2. Description of the Prior Art

A large number of interdigitating slide fasteners of the zipper type are known in the art. The known interdigitating fasteners, however, have the disadvantages of relatively expensive construction, impositive securing and difficulty of effecting desired interdigitation and separation. Further, the known interdigitating slide fasteners do not provide a fully satisfactory seal.

SUMMARY OF THE INVENTION

The invention comprehends a new and improved method of forming an interdigitating fastener including the steps of extruding a core strip of relatively hard material, slitting the core to define a longitudinally extending serpentine slit fully therethrough defining interdigitated core strip portions, extruding a carrier about the slit core strip, slitting the carrier strip at opposite faces of the core strip to define a longitudinally extending slit fully therethrough and crossing in overlying relationship the serpentine core strip slit, and separating the carrier strip along the slit to concurrently separate the core strip portions.

The invention further comprehends the forming of the core strip of a plastic material as by extrusion thereof with a substantially inextensible reinforcement extending longitudinally of the core strip. The reinforcement may comprise a textile cord or the like and may be disposed within the enlarged interlocking portion.

The interlocking of the core strip portions of the carrier may further be effected by a fusing of the materials of the core strip and carrier strip at the interfaces therebetween. The portions of the core strip projecting from the carrier defining the interlocking teeth may have mold release material applied thereto prior to the fusing operation thereby to assure a maintained separation of these portions for subsequent selective interdigitation.

BRIEF DESCRIPTION OF THE DRAWING

Other features and advantages of the invention will be apparent from the following description taken in connection with the accompanying drawing wherein.

DESCRIPTION OF THE PREFERRED EMBODIMENTS

Figures 1, 2, 3, 4, 5, 6, 7:
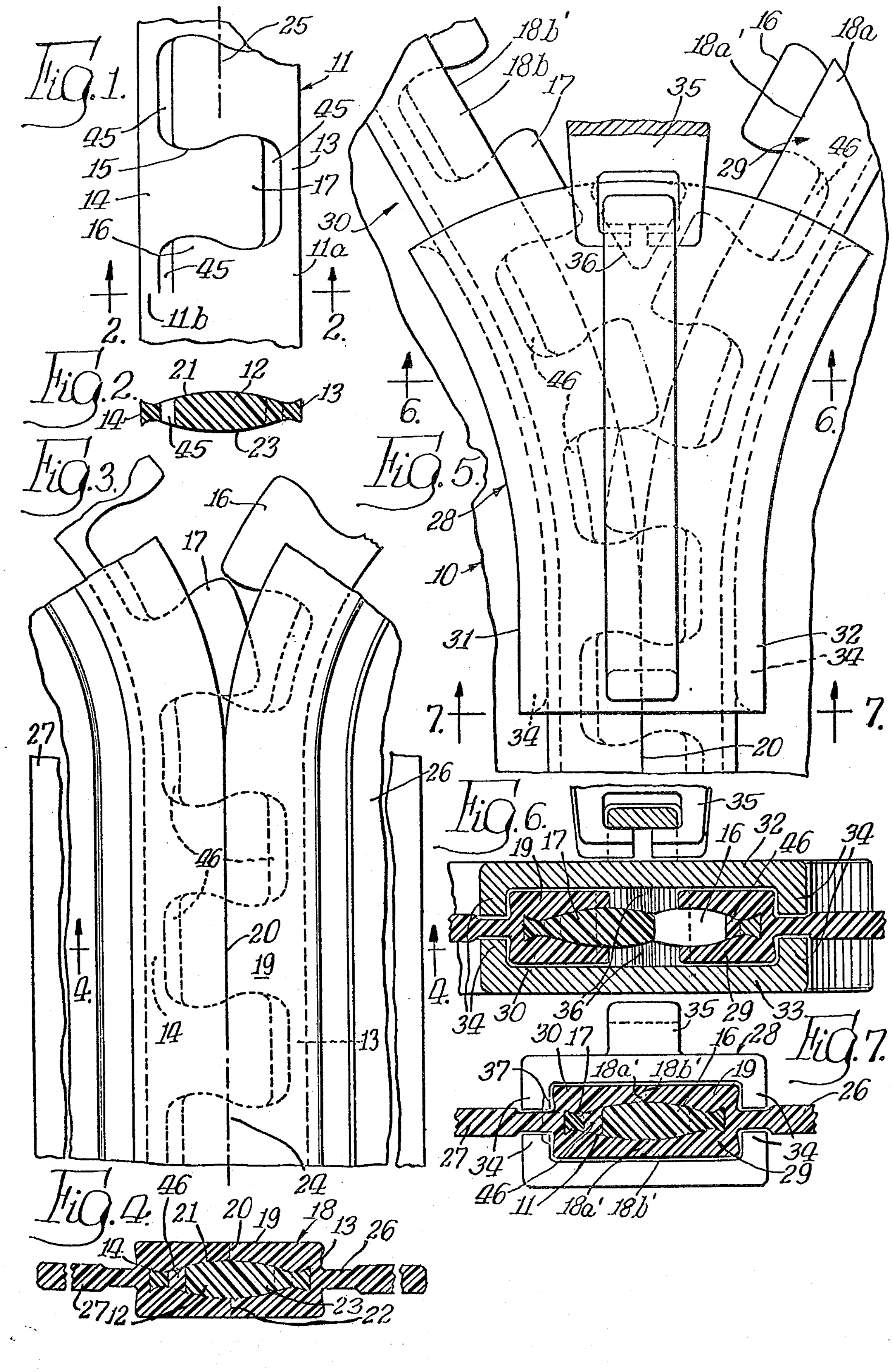
FIG. 1 is a fragmentary top view of a slit core strip for use in an interdigitating fastener embodying the invention.
FIG. 2 is a transverse section thereof taken substantially along the line 2—2 of FIG. 1.
FIG. 3 is a fragmentary top plan view of the slit core strip having a slit carrier strip associated therewith.
FIG. 4 is a fragmentary transverse section taken substantially along the line 4—4 of FIG. 3.
FIG. 5 is a fragmentary top plan view of an interdigitating fastener embodying the invention utilizing the core strip and carrier strip assembly of FIG. 3.
FIG. 6 is a fragmentary transverse section taken substantially along the line 6—6 of FIG. 5.
FIG. 7 is a fragmentary transverse section taken substantially along line 7—7 of FIG. 5.

In the exemplary embodiment of the invention as shown in FIGS. 1–7 of the drawings, an interdigitating fastener generally designated 10 is shown to comprise a core strip 11 formed of relatively hard material such as a plastic. The core strip 11 may be extruded to have a transverse cross-sectional configuration, as shown in FIG. 2, wherein the mid-portion 12 is enlarged and the opposite base portions 13 and 14 are enlarged to define relatively rigid projections comprising effectively turned edge flanges. The core strip 11 is provided with a serpentine through-slit 15, as shown in FIG. 1, to divide the strip 11 into two portions 11*a* and 11*b* having interdigitated distal portions, or interlocking teeth, 16 and 17 respectively. As shown, the portions 16 and 17 interlock as a result of the distally enlarging configuration thereof to define interdigitated coupling means.

The core strip 11 is embedded in a carrier strip generally designated 18 which, as shown in FIGS. 3 and 4, includes a body portion 19 provided with a first through-slit 20 extending upwardly from the upper face 21 of the core strip mid-portion 12 and a second through-slit 22 extending downwardly from the opposite core strip face 23. In the illustrated embodiment, slits 20 and 22 are rectilinear and extend along the longitudinal centerline 24 of the carrier strip 18 in overlying crossing relationship to the serpentine slit 15 of the core strip 11. As shown in FIG. 1, the slit 15 is symmetrically related to the longitudinal centerline 24 of the core strip 11.

As further shown in FIG. 4, the carrier 18 is further provided with laterally outwardly projecting web portions 26 and 27 defining attaching means.

The enlarged edge portions 13 and 14 of the core strip 11 cooperatively define, with the carrier strip 18, mechanical interlock means. Thus, as shown in FIG. 5, when the fastener 10 is separated along the longitudinal centerline thereof, as by means of a slider 28, the carrier strip 18 is divided into a pair of carrier strip portions 18*a* and 18*b* with the enlarged distal portions 16 and 17 of the core strip portions 11*a* and 11*b* projecting inwardly therefrom to be exposed inwardly of the edges 18*a'* and 18*b'* defined by slit 20 of the carrier strip 18. The interlocking portions 13 and 14 effectively positively retain the respective core strip portions 11*a* and

11*b* in the respective carrier strip portions 18*a* and 18*b* thereby to define separable core strip and carrier strip portion assemblies 29 and 30.

As best seen in FIGS. 1 and 6, the core strip 11 defines a plurality of openings 45 disposed between the longitudinally extending base portions 13 and 14 and the confronting distal portions 16 and 17 of the interdigitating teeth. The carrier includes portions 46 as best seen in FIG. 6 which extends through the openings 45 thereby completely enclosing the base portions 13 and 14 outwardly and the respective openings 45 and thereby providing further positive mechanical interlocking means maintaining the core strips in positive retained association with the carrier strip portions 18*a* and 18*b*.

The slider 28 includes a conventional flared guide portion 31 defined by an upper section 32 and a lower section 33 embracing the carrier body portion 19, as shown in FIG. 6. Slider portions 32 and 33 are provided with inturned legs 34 for urging the assemblies 29 and 30 forcibly together to effect interdigitation of the core strip portions 16 and 17, as shown in FIG. 6. For facilitated manipulation of the slider, a pull 35 is connected thereto in the conventional manner to effect such interdigitation as by upward movement of the slider, as seen in FIG. 5.

To effect separation or opening of the fastener 10, the slider is manipulated in an opposite manner to move the slider downwardly, as seen in FIG. 5. The slider includes a diamond wedge 36 which enters between the core portions 16 and 17 to effect a separation thereof, as shown in FIG. 5, as a result of a downward movement therebetween. As seen in FIG. 6, the diamond 36 extends the full height of the assemblies 29 and 30 between the upper and lower portions 32 and 33 of the slider whereby the diamond acts on all slit portions of the fastener concurrently to effect the desired opening of the fastener.

Illustratively, the carrier strip 18 may be formed of a soft resilient plastic, such as vinyl plastic, which is preferably thermally resistant to maintain the physical characteristics thereof under a wide range of temperature conditions. In one excellent example of the fastener, the carrier strip was formed of a polyvinyl chloride having an A-scale durometer hardness of approximately 75. The invention comprehends a further interlocking of the core and carrier strips as by fusing of the plastic material of the core strip portions to the plastic material of the carrier strip portions during an extrusion of the carrier strip onto the core strip. To preclude fusing of the interdigitating tooth portions 16 and 17 of the core strip to the carrier strip, a mold release agent may be applied to portions 16 and 17 prior to the forming of the carrier strip thereto.

Thus, the fastener 10 may be extremely economically formed. The extrusion of core strip 11 may be continuously effected with the slitting being effected therein by a suitable shear of proper serpentine configuration. The carrier strip 18 may be extruded onto the core strip 11 substantially continuously and the slits 20 and 22 effected therein substantially continuously by a suitable slitting knife. As the edges 18*a'* and 18*b'* of the slit carrier 18 are in abutting relationship in the assembled condition of the fastener 10, a seal across the fastener is obtained both above and below the core strip 11, as seen in FIG. 7. The attaching portions 26 and 27 may be secured to suitable adjacent portions of the structure to be fastened as by stitching, stapling, etc. As best seen in FIGs. 4 and 7, the body 19 of the carrier strip 18 may be slightly undercut, as at 37, adjacent the attaching portions to provide low friction in the movement of the slider 28 thereover.

Fastener 10 is extremely simple and economical of construction, while yet providing an improved sealing fastening means. Forming of the core from a relatively hard material provides high strength in the fastener while yet the relatively softer carrier may have improved sealing effect and provides facilitated attachment of the fastener. The slitting of the relatively rigid hard core strip causes the core strip to become relatively flexible in a direction perpendicular to the flatwise extent of the fastener.

In illustrating fastener 10, the slits 20 and 22 are illustrated in the closed arrangement of the fastener as being sealingly closed by the abutting edges of the carrier strip portions. The improved rigid core strip means maintains this desirable positive sealed association. However, as will be obvious to those skilled in the art, where a sealed fastener is not required, the slit edges may be spaced apart as desired. Because of the extreme simplicity and economy of construction, however, fastener 10 may provide the desirable feature of a sealed carrier while yet being lower in cost than the conventional nonsealing fastener.

The invention comprehends the forming of the core strip and carrier strip by many suitable materials. In the preferred form, the strips are extruded for minimized cost. As will be obvious to those skilled in the art, suitable formulations to provide desirable characteristics such as increased strength, hardness, flexibility, and the like, may be used as desired. Further, the fastener may be formed in different colors as desired and may be made in a wide range of sizes including large sizes for use in heavy duty applications, such as with tarpaulins, boat covers, fumigating and pressurized enclosure means, etc. By forming the fastener completely out of plastic materials, maintenance problems such as mildew, corrosion, and the like, are effectively eliminated. Further, as the carrier strip may be formed of a suitable plastic, the carrier strip may be attached to the structure to be interconnected by the fastener by heat sealing, or the like, eliminating the releatively costly conventional sewing operation.

Figure 8:
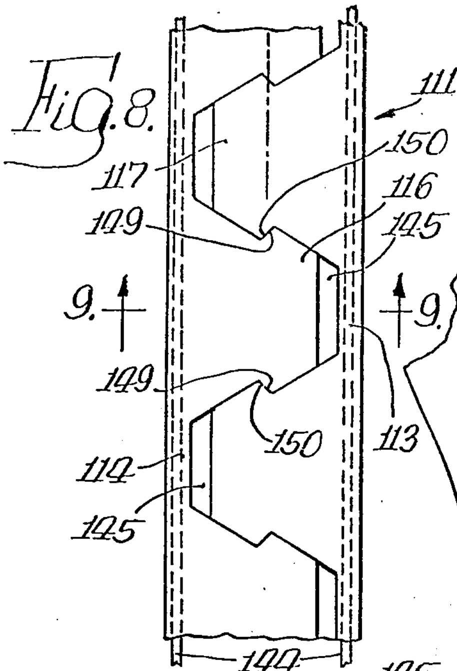
FIG. 8 is a top plan view of a modified form of interdigitating fastener embodying the invention.
Figure 9:
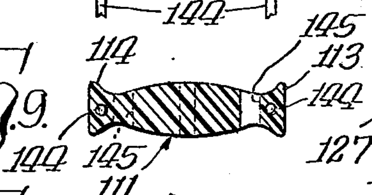
FIG. 9 is a fragmentary transverse section taken substantially along the line 9—9 of FIG. 8.

Turning now to the embodiment of the invention illustrated in FIGS. 8–13, a modified form of fastener embodying the invention generally designated 110 is shown to comprise a fastener generally similar to fastener 10 but having a core strip 111 and a carrier strip 118 which are modified in cross-section to provide further improved sealing in the installed fastener. The core strip 11 is generally similar to core strip 11 of fastener 10 and functions to provide an interdigitating releasable closure of the fastener in a substantially similar manner. However, as shown in FIGS. 8 and 9, the core strip 111 is provided with a longitudinal, substantially inextensible reinforcing means herein comprising a pair of textile cords 144 for precluding stretching of the core strip. As shown in FIG. 9, the reinforcing cords 144 may be disposed within the enlargements 113 and 114 at the opposite sides of the core strip 111. Within the scope of the invention, the reinforcing means 144 may be similarly provided in the core strip 11 as desired. The reinforcing means provides the additional feature of preventing stretching of the core strip during the forming of the carrier strip thereon as may occur where the core strip is formed of a heat stretchable material and the core strip is applied in a heated form such as by extrusion. As shown in FIG. 8, the distal portions, or interdigitating teeth, 116 and 117, may be provided with offset shoulders 149 and 150 providing a positive interdigitated engagement between the teeth. The teeth extend only partially to the base portions 113 and 114 thereby defining openings 145 through which a portion 146 of the carrier strip may extend to provide the desirable encircling interlocked relationship of the carrier strip to the base portions as discussed above relative to fastener 10. The openings 145 may be formed by concurrent removal of the material during the slitting of the core strip. Alternatively, the core strip may be slit to define teeth corresponding directly with the recess of the opposite strip portion and after separation of the core strip portions, the distal end of the teeth may be removed so that upon subsequent interdigitation the openings 145 result.

Figure 10:
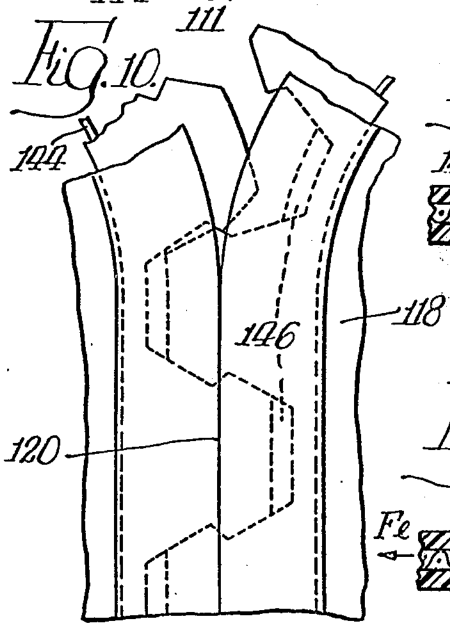
FIG. 10 is a fragmentary top plan view of the slit core strip having a slit carrier strip associated therewith.
Figure 11:
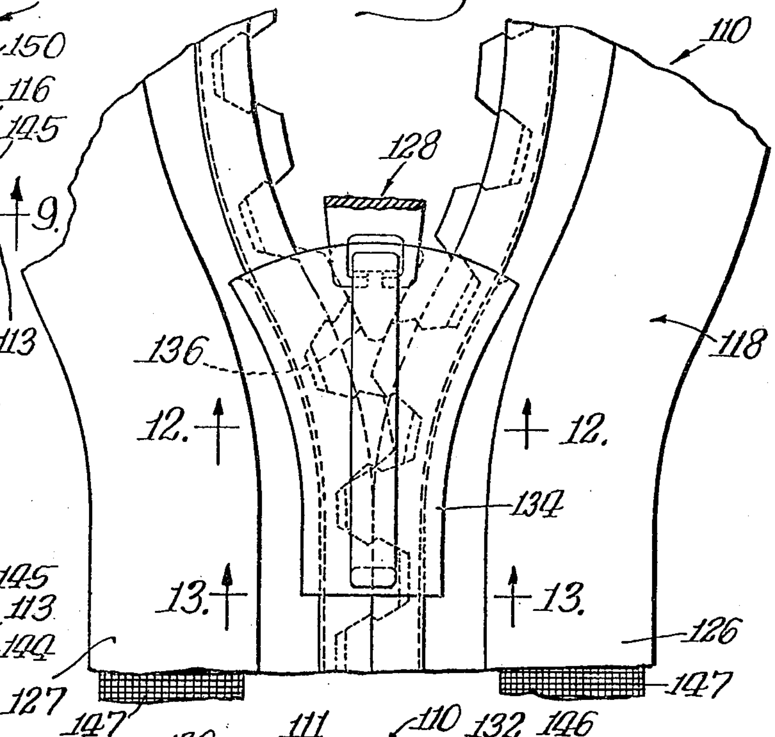
FIG. 11 is a fragmentary top plan view of an interdigitating fastener embodying the invention utilizing the core strip and carrier strip assembly of FIG. 10.
Figure 13:
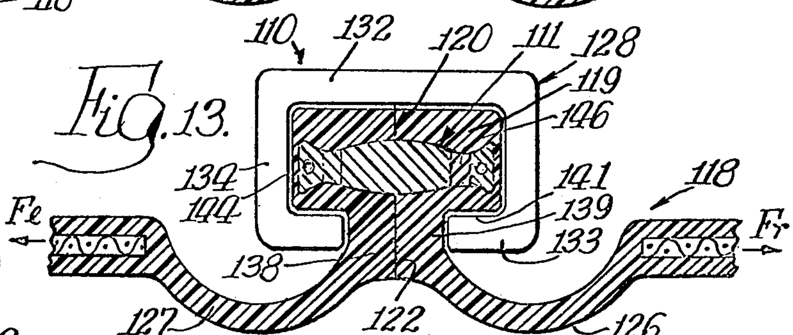
FIG. 13 is a fragmentary transverse section taken substantially along line 13—13 of FIG. 11.

As best seen in FIGS. 10 and 11, carrier strip 118 is provided with attaching webs 126 and 127 extending from a lower portion 138 of the carrier strip 118 which is spaced from the body portion 119 thereof by a thin spacer portions 139. Lower portion 138 and spacer portion 139 are provided with a slit 122 along the longitudinal centerline thereof and body portion 119 is provided with a slit 120 along the longitudinal centerline thereof, as shown in FIG. 13.

Body portion 119 may be somewhat thinner than body portion 19 of fastener 10 whereby the interlocking portions 113 and 114 of the core strip 111 are disposed closely adjacent the laterally outer surfaces 140 of the carrier strip body 119, thereby providing a relatively rigid guiding surface for the slider legs 134.

Figure 12:
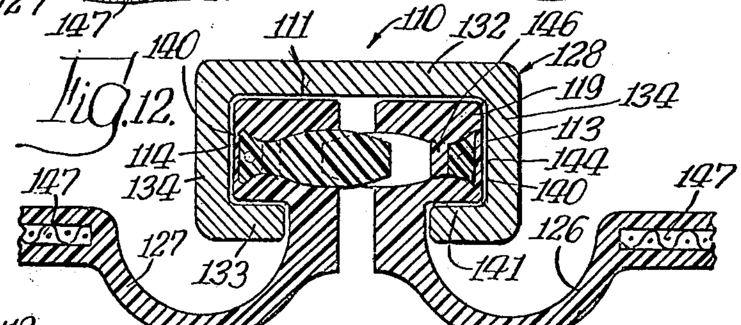
FIG. 12 is a fragmentary transverse section taken substantially along line 12—12 of FIG. 11.

The slider diamond 136 may extend only above the upper surface of the core strip. The slider legs 134 connect the upper portion 132 to the lower inturned flange portion 133 underlying the carrier strip body portion 119. The inturned legs 133 extend to closely adjacent the narrow spacer portion 139 whereby the slider effectively is mounted on the carrier strip body portion 119. As shown in FIGS. 12 and 13, the spacing of the attaching portions 126 from the lower face 141 of the carrier strip body portion 119, and thus below the core strip 111, is substantially greater than the thickness of the legs 133 to permit free sliding movement of the slider on the core strip body.

Figure 15:
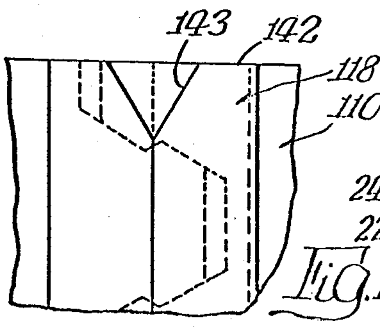
FIG. 15 is a fragmentary top plan view of one end of the assembled core strip and carrier strip of a further modified form of fastener embodying the invention.

As shown in FIG. 15, the upper end 142 of the carrier strip 118 is provided with a triangular shaped recess 143 which is complementary to the diamond 136 so that when the slider 128 is brought fully to the upper end of the fastener 110, the diamond may be received in the recess 143 permitting the carrier strip edges at 120 and 122 to be sealingly closed along their entire longitudinal extent.

A highly desirable advantage of the construction of fastener 110 is the improved sealing thereof as the result of forces tending to pull the attaching portions 126 and 127 apart, as may occur in the conventional fastening functioning. Thus, as best seen in FIG. 13, forces F*r* and F*l* acting concurrently to the right on attaching portion 126 and to the left on attaching portion 127 tend to pivot the carrier body about the relatively rigid core strip 111 whereby more forceful abutment of the carrier strip portions along slit 120 is effected. While such pivoting may tend to urge the lowermost portion of the carrier body 119 slightly outwardly, the slider may be moved relatively easily on body 119 as a result of the relatively rigid mounting means defined by the hard core portions 113 and 114 adjacent the outer surface of the carrier strip body. Thus, fastener 110 provides improved sealing while yet assuring facilitated simple operation thereof by selective opening and closing movements of the slider 128.

Figure 14:
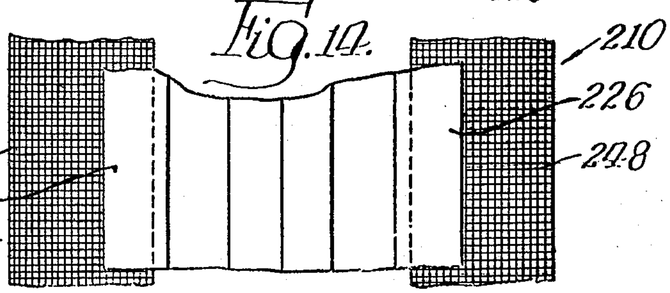
FIG. 14 is a fragmentary plan view of a modified form of interdigitating fastener embodying the invention.

As shown in FIGS. 12 and 13, the attaching portions 126 and 127 may be somewhat rounded to provide improved resiliency in the fastener 110 relative to the forces F*r* and F*l*. The attaching portions 126 and 127 may be provided with fabric reinforcements 147 for improved strength in joining the fastener to the structures to be connected thereby. Referring to FIG. 14, a further modified form of fastener generally designated 210 is shown to comprise a fastener similar to fastener 110 but having fastening portions 226 and 227 provided with fabric reinforcements 248 which extend laterally outwardly from the portions 226 and 227 for use in joining the fastener to fabric and the like.

The elements of fasteners 110 and 210 may be formed similarly to the elements of fastener 10 by simple and economical extrusion and shearing operations. Thus, the fasteners 110 and 210 may be similarly made by continuous manufacturing steps effectively minimizing the cost thereof. Elements of fasteners 110 and 210 corresponding to similar elements of fastener 10 are identified by similar reference numerals but 100 or 200 higher. Fasteners 110 and 210 function similarly to fastener 10, except as otherwise noted above.

While I have shown and described certain embodiments of my invention, it is to be understood that it is capable of many modifications. Changes, therefore, in the construction and arrangement may be made within the spirit and scope of the invention as defined in the appended claims.

I claim:

1. The method of forming an interdigitating fastener comprising the steps of:

extruding a core strip of relatively hard material;

slitting said core strip to define a single longitudinally extending serpentine slit fully therethrough defining interdigitated core strip portions;

extruding a carrier strip of relatively soft material about said interdigitated slit core strip;

slitting said interdigitated carrier strip in overlying relationship to said serpentine core strip slit; and separating the carrier strip along the slit to concurrently separate said core strip portions.

2. The method of claim 1 further including the step of interlocking the core strip portions and carrier strip portions by providing complementary mechanical interlocking means on each said core strip portion and said carrier.

3. The method of claim 1 further including the step of fusing the carrier strip to the core strip portions to interlock the same prior to said separating step.

4. The method of claim 1 further including the step of fusing the carrier fully about preselected portions of the core strip to mechanically interlock the core strip to the carrier.

5. The method of claim 1 further including the step of providing a substantially inextensible longitudinal reinforcement in said core strip.

6. The method of claim 1 further including the step of providing a mold release on the projecting portions of the slit core strip defining interdigitating teeth, and fusing the carrier strip to the core strip at all portions of the core strip not having the mold release applied thereto.

7. The method of forming an interdigitating fastener comprising the steps of: forming a core strip of relatively hard material; slitting said core strip to define a longitudinally extending serpentine slit fully therethrough defining separate core strip portions having interdigitated teeth; extruding a carrier strip of relatively soft material integrally about said interdigitated slit core strip portions; and slitting said carrier strip in overlying and underlying relationship to the longitudinal centerline of said serpentine core strip slit to form longitudinal portions of said carrier strip secured one each to said interdigitated core strip portions.

8. The method of claim 7 further including the step of interlocking the core strip portions and carrier strip portions by providing complementary mechanical interlocking means on each said core strip portion and said carrier.

9. The method of claim 7 further including the step of fusing the carrier strip to the core strip portions to interlock the same.

10. The method of claim 7 further including the step of fusing the carrier fully about preselected portions of the core strip to mechanically interlock the core strip to the carrier.

11. The method of claim 7 further including the step of providing a substantially inextensible longitudinal reinforcement in said core strip.

12. The method of claim 7 further including the step of providing a mold release on the projecting portions of the slit core strip defining interdigitating teeth, and fusing the carrier strip to the core strip at all portions of the core strip not having the mold release applied thereto.

13. The method of claim 7 including the steps of forming a through opening in said core strip, and molding a portion of said carrier through said opening to interlock the core strip and carrier strip.

14. The method of claim 7 including the steps of removing portions of the core strip at the distal ends of the teeth to define a plurality of through openings in said core strip, and molding a portion of said carrier through said opening to interlock the core strip and carrier strip.

15. The method of claim 14 wherein said removing step comprises a step of truncating said teeth.

16. The method of claim 7 wherein said carrier slitting step comprises a step of passing a knife inwardly through the centerline portion of the carrier substantially to the outer surface of the core strip.

17. The method of claim 7 wherein said carrier is molded to fabric material.

18. The method of claim 7 wherein said step of forming the carrier comprises a step of extruding the carrier.

19. The method of forming an interdigitating fastener comprising the steps of:

providing a textile fabric;

molding a cooperating inner core strip and outer carrier means in association with each other and said fabric; and slitting said core strip and carrier means to define separable core strip portions having interdigitated teeth and a longitudinally slit outer carrier having longitudinal opposite side portions secured one each to said interdigitated core strip portions, said fabric defining separate longitudinally extending side portions associated one each with the corresponding associated said carrier side portions and core strip portions.

20. The method of forming an interdigitating fastener of claim 19 wherein said core member and fabric are caused to define separate side portions prior to the molding of said carrier in association therewith.

21. The method of forming an interdigitating fastener of claim 19 wherein the carrier is molded to extend from each of the opposite faces of said fabric.

22. The method of forming an interdigitating fastener of claim 19 wherein the fabric extends laterally outwardly from said cooperating core strip and carrier means.

23. The method of forming an interdigitating slide fastener comprising the steps of:

extruding a core strip of relatively hard material; cutting said core strip to define a series of separable interdigitated core strip portions;

coating a carrier of relatively soft material to said cut core strip; and slitting said carrier longitudinally in overlying relationship to said cut interdigitated core strip.

24. The method of claim 23 further including the step of bonding the carrier to the core portions prior to separating the fastener along the longitudinal slit in said carrier.

25. The method of claim 23 further including the step of fusing the carrier fully about preselected portions of the core strip to mechanically interlock the core strip to the carrier.

26. The method of claim 23 further including the step of providing a substantially inextensible longitudinal reinforcement in said core strip.

27. The method of claim 23 further including the step of providing a mold release on the projecting portions of the slit core strip defining interdigitating teeth, and fusing the carrier strip to the core strip at all portions of the core strip not having the mold release applied thereto.

28. The method of claim 23 further including the step of bonding the said core strip to a substantially inextensible longitudinal reinforcement.

* * * * *